United States Patent
Hase et al.

(10) Patent No.: US 10,559,403 B2
(45) Date of Patent: Feb. 11, 2020

(54) COMPOSITION HAVING OIL FILM RETENTION FUNCTION, ANTICORROSIVE AGENT USING SAME, AND INSULATED TERMINATED ELECTRIC WIRE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

(72) Inventors: Tatsuya Hase, Yokkaichi (JP); Takehiro Hosokawa, Yokkaichi (JP); Kazuo Nakashima, Yokkaichi (JP); Kazuhiro Goto, Osaka (JP); Hiroki Hirai, Yokkaichi (JP); Junichi Ono, Yokkaichi (JP); Takuji Otsuka, Yokkaichi (JP); Hideki Nomura, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP)

(*) Notice: Subject to any disclaimer, the term of this patent is extended or adjusted under 35 U.S.C. 154(b) by 690 days.

(21) Appl. No.: 14/779,201

(22) PCT Filed: Sep. 26, 2014

(86) PCT No.: PCT/JP2014/075576
§ 371 (c)(1),
(2) Date: Sep. 22, 2015

(87) PCT Pub. No.: WO2015/056546
PCT Pub. Date: Apr. 23, 2015

(65) Prior Publication Data
US 2016/0211053 A1    Jul. 21, 2016

(30) Foreign Application Priority Data

Oct. 17, 2013  (JP) ................................. 2013-216171

(51) Int. Cl.
*H01B 7/28* (2006.01)
*C10M 133/46* (2006.01)
(Continued)

(52) U.S. Cl.
CPC ......... *H01B 7/2806* (2013.01); *C10M 101/02* (2013.01); *C10M 105/02* (2013.01);
(Continued)

(58) Field of Classification Search
None
See application file for complete search history.

(56) References Cited

U.S. PATENT DOCUMENTS 3,778,454 A * 12/1973 Kleiman .................. C10M 3/00
                                               508/492
4,389,259 A *  6/1983 Danner ..................... C07F 9/14
                                               106/14.12
(Continued)

FOREIGN PATENT DOCUMENTS

EP   0 837 156 A1   4/1998
GB   1 518 342 A    7/1978
(Continued)

OTHER PUBLICATIONS

Jun. 22, 2016 Extended European Search Report issued in Patent Application No. 14853763.2.
(Continued)

*Primary Examiner* — Joseph D Anthony
(74) *Attorney, Agent, or Firm* — Oliff PLC

(57) ABSTRACT

A composition having an oil film retention function which an oil film can be stably retained on surfaces of various metals, an anticorrosive agent using same, and insulated terminated electric wire. A composition having oil film retention function for being added to base oil to be applied onto a metal surface and retaining base oil on metal surface, and composition contains a component that is an adduct of an azole compound and acidic alkyl phosphate ester including one or more compounds represented by General Formulae (1) (Chemical Formula 1) P(=O)(—OR$_1$)
(Continued)

(—OH)$_2$ ... (1) or General Formula (2) (Chemical Formula 2) P(=O)(—OR$_1$)$_2$(—OH) ... (2) where R$_1$ represents an organic group having four or more carbon atoms, and component that is an adduct of a metal and/or organic amine compound and acidic alkyl phosphate ester including one or more compounds represented by General Formulae (1) or (2).

6 Claims, 1 Drawing Sheet

(51) Int. Cl.

| | | |
|---|---|---|
| *C10M 169/04* | (2006.01) | |
| *C10M 105/02* | (2006.01) | |
| *C10M 101/02* | (2006.01) | |
| *C23F 11/10* | (2006.01) | |
| *C23F 11/167* | (2006.01) | |
| *C23F 11/14* | (2006.01) | |
| *C23F 11/16* | (2006.01) | |
| *H01B 3/20* | (2006.01) | |
| *C10M 137/06* | (2006.01) | |
| *C10M 163/00* | (2006.01) | |
| *C10M 137/08* | (2006.01) | |
| *C10M 137/04* | (2006.01) | |
| *C10M 133/42* | (2006.01) | |
| *C10M 135/36* | (2006.01) | |

(52) U.S. Cl.
CPC ........ *C10M 133/42* (2013.01); *C10M 133/46* (2013.01); *C10M 135/36* (2013.01); *C10M 137/04* (2013.01); *C10M 137/06* (2013.01); *C10M 137/08* (2013.01); *C10M 163/00* (2013.01); *C10M 169/04* (2013.01); *C23F 11/10* (2013.01); *C23F 11/149* (2013.01); *C23F 11/165* (2013.01); *C23F 11/1673* (2013.01); *H01B 3/20* (2013.01); *H01B 7/28* (2013.01); *C10M 2203/1025* (2013.01); *C10M 2205/0285* (2013.01); *C10M 2223/023* (2013.01); *C10M 2223/042* (2013.01); *C10M 2223/043* (2013.01); *C10N 2210/01* (2013.01); *C10N 2210/02* (2013.01); *C10N 2210/04* (2013.01); *C10N 2230/12* (2013.01); *C10N 2230/56* (2013.01); *C10N 2240/20* (2013.01); *C10N 2240/201* (2013.01)

(56) References Cited

U.S. PATENT DOCUMENTS

| | | | | |
|---|---|---|---|---|
| 4,511,481 | A | * | 4/1985 | Shim .................. C07D 249/18 252/389.21 |
| 5,141,675 | A | | 8/1992 | Vanderpool et al. |
| 5,646,098 | A | * | 7/1997 | Brois .................. C07C 45/71 508/189 |
| 6,180,575 | B1 | * | 1/2001 | Nipe .................. C10M 169/044 508/227 |
| 7,696,137 | B2 | * | 4/2010 | Yagishita ............ C10M 137/00 508/294 |
| 2005/0143266 | A1 | * | 6/2005 | Yagishita ............ C10M 137/00 508/294 |

FOREIGN PATENT DOCUMENTS

| | | |
|---|---|---|
| JP | S56-169780 A | 12/1981 |
| JP | S58-098398 A | 6/1983 |
| JP | H05-86488 A | 4/1993 |
| JP | H10-147788 A | 6/1998 |
| JP | H11-323363 A | 11/1999 |
| JP | 2002-206094 A | 7/2002 |
| JP | 2002-522590 A | 7/2002 |
| JP | 2004-059658 A | 2/2004 |
| JP | 2004-161976 A | 6/2004 |
| JP | 4137548 B2 | 8/2008 |
| JP | 4824934 B2 | 11/2011 |
| JP | 2012-162607 A | 8/2012 |
| JP | 2013-108033 A | 6/2013 |
| WO | 00/08119 A1 | 2/2000 |

OTHER PUBLICATIONS

Jan. 22, 2017 Office Action issue in Chinese Patent Application No. 201480031097.0.
Jul. 26, 2017 Office Action issued in Chinese Patent Application No. 201480031097.0.
Dec. 22, 2014 International Search Report issued in International Patent Application No. PCT/JP2014/075576.

* cited by examiner

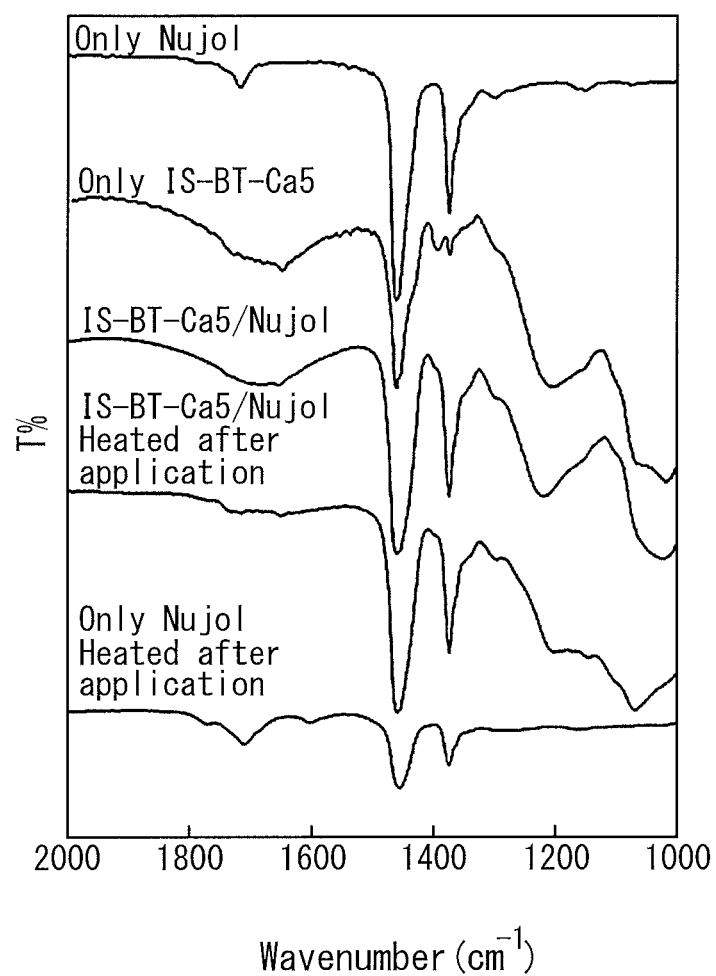

COMPOSITION HAVING OIL FILM RETENTION FUNCTION, ANTICORROSIVE AGENT USING SAME, AND INSULATED TERMINATED ELECTRIC WIRE

TECHNICAL FIELD

The present invention relates to a composition having an oil film retention function for protecting a metal surface that is preferably used in an automotive component, an electrical/electronic device, an aircraft component and the like, an anticorrosive agent using the same, and an insulated terminated electric wire.

BACKGROUND ART

An oil component is widely used for lubrication and anticorrosion in various metal components and metal apparatuses. When used as machine oil, for example, a sufficient amount of an oil component is used for a metal surface of a gear, a piston, or the like. In this case, a new oil component is always supplied on the metal surface, and therefore, when an attempt is made to impart extreme-pressure properties or anticorrosive properties to the oil component, a sufficient function can be obtained by adding an intended additive in a certain amount thereto (Patent Documents 1 to 4). On the other hand, when the oil component is used for preventing the metal surface from being exposed to ambient air and water or for maintaining a uniform lubrication, the oil component is applied onto the metal surface (Patent Document 5).

CITATION LIST

Patent Documents

Patent Document 1: JP 2013-108033A
Patent Document 2: JP 2004-161976A
Patent Document 3: Japanese Patent No. 4137548
Patent Document 4: JP 2012-162607A
Patent Document 5: Japanese Patent No. 4824934

SUMMARY OF INVENTION

Technical Problem

An oil film for blocking the metal surface from ambient air and water is needed in order to prevent the metal surface from being exposed to ambient air and water or for maintaining a uniform lubrication. In this case, there is a risk that the excessive application of the oil component onto the metal surface causes stickiness and dripping, thus impairing the workability and contaminating surrounding base materials. Therefore, it is necessary to apply the oil component as thinly as possible. However, if the oil component is applied too thinly, it becomes difficult to retain a stable oil film on the metal surface for a long period of time. In particular, under high temperature conditions, the oil component may be turned into low molecular weight molecules due to oxidation or volatilize, thus making it more difficult to retain a stable oil film on the metal surface. This is because the oil component does not chemically bond to the metal surface but is in contact with the metal surface due to van der Waals forces, which exhibits only weak adhesive force.

The above patent documents describe lubricating oil additives that can interact with the metal surface, but do not state that the additives can exhibit the same effect for various metals. For example, transition metals and typical metals are different from each other with respect to the electronic state of the metal atom, that is, transition metals have high coordinate bonding properties, whereas typical metals have high ion bonding properties. Moreover, the metals are different from each other with regard to the oxidation state of the surface, and therefore, it is difficult for additives to exhibit the same effect for a plurality of types of metals.

It is an object of the present invention to provide a composition having an oil film retention function with which an oil film can be stably retained on the surfaces of various metals, an anticorrosive agent using the same, and an insulated terminated electric wire.

Solution to Problem

In order to solve the foregoing problems, a composition having an oil film retention function according to the present invention is a composition having an oil film retention function, for being added to base oil to be applied onto a metal surface and retaining the base oil on the metal surface, and contains components (a) and (b) below.

(a) An adduct of an azole compound and an acidic alkyl phosphate ester including one or more compounds represented by General Formulae (1) or (2) below.

(b) An adduct of a metal and/or an organic amine compound and an acidic alkyl phosphate ester including one or more compounds represented by General Formulae (1) or (2) below.

(Chemical Formula 1)

$$P(=O)(-OR_1)(-OH)_2 \qquad (1)$$

(Chemical Formula 2)

$$P(=O)(-OR_1)_2(-OH) \qquad (2)$$

It should be noted that $R_1$ represents an organic group having four or more carbon atoms.

In this case, it is preferable that a content ratio of the component (a) to the component (b) in molar ratio is 1:9 to 9:1. It is preferable that the pH of the composition is set to 4 or more.

The azole compound includes at least one selected from pyrrole, imidazole, pyrazole, 1,2,3-triazole, 1,2,4-triazole, tetrazole, isoindole, benzimidazole, indazole, 1H-benzotriazole, 2H-benzotriazole, imidazo[4,5-b]pyridine, indole, purine, pyrazolo[3,4-d]pyrimidine, triazolo[4,5-d]pyrimidine, and benzothiazole, or a derivative thereof.

The metal includes at least one selected from alkali metals, alkaline earth metals, aluminum, titanium, and zinc. The organic amine compound includes organic amine compounds having 2 to 100 carbon atoms.

An anticorrosive agent according to the present invention is an anticorrosive agent containing a base oil and the above-described composition having an oil film retention function.

An insulated terminated electric wire according to the present invention is an insulated terminated electric wire in which an electrical connection portion between a terminal fitting and an electric wire conductor is covered with the above-described anticorrosive agent.

Advantageous Effects of the Invention

With the composition having an oil film retention function according to the present invention, the composition can be added to the base oil to be applied onto the metal surface and stably retain the base oil on the metal surface since the composition contains the above components (a) and (b). This effect can be exhibited for both transition metals and typical metals, that is, for various metals.

In this case, if the content ratio of the component (a) to the component (b) in molar ratio is 1:9 to 9:1, the above effect can be exhibited for various metals in a well-balanced manner. Moreover, if the pH is set to 4 or more, the above effect for transition metals is particularly improved.

If the azole compound is selected from the azole compounds shown above, the composition has excellent coordination force and is excellent in the above effect for transition metals.

If the metal is at least one selected from alkali metals, alkaline earth metals, aluminum, titanium, and zinc, the metal has a higher ionization tendency than Sn, for example, and therefore, the composition can be made to have excellent ion bonding properties for Sn.

If the organic amine compound has 2 to 100 carbon atoms, an adduct of the organic amine compound and the acidic alkyl phosphate ester can be made into a liquid form that has a viscosity with which the adduct can be handled at room temperature, and thus has an excellent handle ability.

Since the anticorrosive agent according to the present invention contains the base oil and the composition having an oil film retention function according to the present invention, the anticorrosive agent can be stably retained on the metal surface and stably exhibit an anticorrosive performance for a long period of time. Moreover, this effect can be exhibited for both transition metals and typical metals, that is, for various metals.

With the insulated terminated electric wire according to the present invention, the electrical connection portion between a terminal fitting and an electric wire conductor is covered with the anticorrosive agent according to the present invention, and therefore, a stable anticorrosive performance is exhibited for a long period of time.

BRIEF DESCRIPTION OF DRAWINGS

FIG. 1 shows IR spectra of various materials related to the evaluation of oil film retainability.

DESCRIPTION OF EMBODIMENTS

Next, an embodiment of the present invention will be described in detail.

A composition having an oil film retention function according to the present invention (also referred to as "present composition" hereinafter) is a composition having an oil film retention function, for being added to base oil to be applied onto a metal surface and retaining the base oil on the metal surface, and contains components (a) and (b) below.

(a) An adduct of an azole compound and an acidic alkyl phosphate ester including one or more compounds represented by General Formulae (1) or (2) below.

(b) An adduct of a metal and/or an organic amine compound and an acidic alkyl phosphate ester including one or more compounds represented by General Formulae (1) or (2) below.

(Chemical Formula 3)

$$P(=O)(-OR_1)(-OH)_2 \quad (1)$$

(Chemical Formula 4)

$$P(=O)-OR_1)_2(-OH) \quad (2)$$

It should be noted that $R_1$ represents an organic group having four or more carbon atoms.

Examples of the component (a) include a compound constituted by only an adduct of a compound represented by General Formula (1) and an azole compound, a compound constituted by only an adduct of a compound represented by General Formula (2) and an azole compound, and a compound constituted by only an adduct of a compound represented by General Formula (1) and an azole compound and an adduct of a compound represented by General Formula (2) and an azole compound.

Examples of the component (b) include a compound constituted by only an adduct of a compound represented by General Formula (1) and a metal, a compound constituted by only an adduct of a compound represented by General Formula (1) and an organic amine compound, a compound constituted by only an adduct of a compound represented by General Formula (1) and a metal and an adduct of a compound represented by General Formula (1) and an organic amine compound, a compound constituted by only an adduct of a compound represented by General Formula (2) and a metal, a compound constituted by only an adduct of a compound represented by General Formula (2) and an organic amine compound, a compound constituted by only an adduct of a compound represented by General Formula (2) and a metal and an adduct of a compound represented by General Formula (2) and an organic amine compound, a compound constituted by only an adduct of a compound represented by General Formula (1) and a metal and an adduct of a compound represented by General Formula (2) and a metal, and a compound constituted by only an adduct of a compound represented by General Formula (1) and an organic amine compound and an adduct of a compound represented by General Formula (2) and an organic amine compound.

Examples of the acidic alkyl phosphate ester include a compound constituted by only a compound represented by General Formula (1), a compound constituted by only a compound represented by General Formula (2), and a compound constituted by only a compound represented by General Formula (1) and a compound represented by General Formula (2).

In the acidic alkyl phosphate ester, $R_1$ is constituted by an organic group having 4 or more carbon atoms. The acidic alkyl phosphate ester has an organic group having a certain number of carbon atoms, and thus has an excellent compatibility with base oil that is a long-chain alkyl compound. Therefore, the acidic alkyl phosphate ester improves the compatibility between the present composition and the base oil. This makes it possible for the acidic alkyl phosphate ester to make a mixture of the present composition and the base oil into a liquid form. Accordingly, the acidic alkyl phosphate ester imparts favorable application properties for the metal surface to an anticorrosive agent containing the present composition and the base oil.

From the viewpoint of excellent compatibility with the base oil, $R_1$ has preferably 4 or more carbon atoms, and more preferably 6 or more carbon atoms. On the other hand, from the viewpoint of versatility and cost, $R_1$ has preferably 30 or less carbon atoms, more preferably 26 or less carbon atoms, and even more preferably 22 or less carbon atoms.

There is no particular limitation on $R_1$ as long as $R_1$ is an organic group having 4 or more carbon atoms, and examples thereof include an alkyl group constituted by a saturated hydrocarbon, an alkenyl group constituted by an unsaturated hydrocarbon, and a hetero element-containing group. From the viewpoint of excellent compatibility with the base oil, an alkyl group constituted by a saturated hydrocarbon and an alkenyl group constituted by an unsaturated hydrocarbon are preferable as $R_1$. The alkyl group and the alkenyl group may have any of a linear structure, a branched structure and a cyclic structure.

Examples of an acidic alkyl phosphate ester having an alkyl group as $R_1$ include butyl acid phosphate, 2-ethylhexyl acid phosphate, isodecyl acid phosphate, lauryl acid phosphate, tridecyl acid phosphate, stearyl acid phosphate, oleyl acid phosphate, isostearyl acid phosphate, and di-2-ethylhexyl acid phosphate. Of these, oleyl acid phosphate and isostearyl acid phosphate are preferable from the viewpoint in which an adduct formed has more excellent compatibility with the base oil.

Examples of the hetero element-containing group include groups containing a hetero element such as N, O and S. Examples thereof include an alkyl chain and an alkenyl chain including an ether bond, an ester bond, an amide bond, a thioether bond, a thioester bond, or the like.

An azole compound mainly strengthens a bond to a transition metal, which has high coordinate bonding properties, due to an effect of an unshared electron pair of a nitrogen atom included in the molecule. Moreover, since an adduct of the azole compound and the acidic alkyl phosphate ester is a liquid, the azole compound can keep the present composition in a liquid form. This makes the compatibility between the present composition and the base oil favorable, thus making it possible to make a mixture of the present composition and the base oil into a liquid form. Accordingly, the azole compound imparts favorable application properties for the metal surface to the anticorrosive agent containing the present composition and the base oil.

Examples of the azole compound include an azole, a diazole, a triazole and a tetrazole. More specific examples thereof include pyrrole, imidazole, pyrazole, 1,2,3-triazole, 1,2,4-triazole, tetrazole, isoindole, benzimidazole, indazole, 1H-benzotriazole, 2H-benzotriazole, imidazo[4,5-b]pyridine, indole, purine, pyrazolo[3,4-d]pyrimidine, triazolo[4,5-d]pyrimidine, and benzothiazole, or a derivative thereof. These may be used alone or in a combination of two or more. Of these, 1H-benzotriazole is preferable from the viewpoint of coordinate bonding properties for the transition metals.

Metal and an organic amine compound mainly strengthen a bond to a typical metal, which has high ion bonding properties. Although the acidic alkyl phosphate ester itself is likely to bind to the typical metal, which has high ion bonding properties, the acidic alkyl phosphate ester has a too high acidity, and thus is likely to corrode the metal surface. The metal and the organic amine compound can increase the pH of the composition and reduce the acidity thereof.

Examples of the metal include alkali metals such as Li, Na and K; alkaline earth metals such as Mg and Ca; aluminum; titanium; and zinc. These may be used alone or in a combination of two or more. Of these, Li and Ca are preferable from the viewpoint in which an adduct formed has more excellent compatibility with the base oil.

As the organic amine compound, an organic amine compound having 2 to 100 carbon atoms is preferable from the viewpoint of versatility and viscosity of an adduct formed. An organic amine compound having 4 to 22 carbon atoms is more preferable. More specific examples of the organic amine compound include octylamine, laurylamine, myristylamine, stearylamine, behenylamine, oleylamine, beef tallow alkylamine, hardened beef tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, beef tallow dimethylalkylamine, hardened beef tallow dimethylalkylamine, and dimethyloleylamine. These may be used alone or in a combination of two or more. Of these, octylamine and laurylamine are preferable from the viewpoint of versatility and viscosity of an adduct formed.

It is preferable that the content ratio of the component (a) to the component (b) in molar ratio is 1:9 to 9:1. Such a content ratio makes it possible for an effect of stably retaining the base oil on the metal surface to be exhibited for various metals in a well-balanced manner. When the ratio of the component (a) increases, the coordinate bonding properties are improved. On the other hand, when the ratio of the component (b) increases, the ion bonding properties are improved. The content ratio of the component (a) to the component (b) is preferably 2:8 to 8:2, and more preferably 3:7 to 7:3.

In the present composition, the amount of residual phosphate groups (P—OH groups) is determined by the ratio between the acidic alkyl phosphate ester, the azole compound, and the metal and/or the organic amine compound. When the ratio of the acidic alkyl phosphate ester increases, the amount of residual phosphate groups (P—OH groups) increases, and the acidity increases (the pH decreases). When the ratio of the acidic alkyl phosphate ester decreases, the amount of residual phosphate groups (P—OH groups) decreases, and the acidity decreases (the pH increases). If the acidity of the present composition increases, the bonding properties thereof for the transition metals decrease, and therefore, it is preferable to suppress the acidity to a low level. From this viewpoint, the pH of the present composition is preferably 4 or more, and more preferably 5.5 or more. On the other hand, from the viewpoint of maintaining the ion bonding properties, the pH of the present composition is preferably 9 or less, and more preferably 8 or less.

When $f=l\times x-m\times y-n\times z$, where $x^-$ represents the valence of the acidic alkyl phosphate ester, $y^+$ represents the valence of the azole compound, $z^+$ represents the valence of the metal and/or the organic amine compound, l represents the number of moles of the acidic alkyl phosphate ester, m represents the number of moles of the azole compound, and n represents the number of moles of the metal and/or the organic amine compound, the acidic alkyl phosphate ester is excessive in a range of 0<f<2, and there are residual phosphate groups (P—OH groups). When f=0, a total of the azole compound and the metal and/or organic amine compound is equivalent to the acidic alkyl phosphate ester, and there are no residual phosphate groups (P—OH groups). Moreover, when f<0, the acidic alkyl phosphate ester runs short, and there are no residual phosphate groups (P—OH groups). It is preferable that f≤0 in order to increase the pH of the present composition.

The above-described present composition can be mixed with the base oil to constitute various oil compositions such as a lubricant and an anticorrosive agent.

The anticorrosive agent according to the present invention is constituted by an agent containing the present composition and the base oil. The anticorrosive agent according to the present invention covers the metal surface and prevents the corrosion of the metal. The anticorrosive agent according to the present invention contains the present composition, thus making it possible to stably retain the base oil on the metal surface. Moreover, this effect can be exhibited for both transition metals and typical metals, that is, for various metals.

Examples of the base oil include alkylbenzene, alkylnaphthalene, polybutene, mineral oil, synthetic ester, oil and fat, silicone oil, polyglycol, normal paraffin, isoparaffin, and polyether, or oil obtained by blending two or more of these compounds. Of these, mineral oil and paraffinic oil are preferable from the viewpoint of the thermal stability.

The amount of the present composition contained in the anticorrosive agent according to the present invention is preferably 3 mass % or more from the viewpoint of maintaining the density of an alkyl group formed on the metal surface, and more preferably 5 mass % or more. On the other hand, the amount thereof is preferably 90 mass % or less from the viewpoint of maintaining the thickness of the oil film, and more preferably 80 mass % or less.

It is preferable that the anticorrosive agent according to the present invention is in a liquid form (or in a fluid state) at 20 to 100° C. from the viewpoint of excellent application properties for the metal surface. If $R_1$ of the acidic alkyl phosphate ester has a small number of carbon atoms such as less than four carbon atoms or only a metal is a component for forming an adduct with the acidic alkyl phosphate ester, for example, the present composition has poor compatibility with the base oil, and a mixture of the present composition and the base oil is not in a liquid form in the above temperature range, thus making it difficult to apply the mixture onto the metal surface.

When the anticorrosive agent according to the present invention is applied onto the metal surface, the film thickness is preferably 30 μm or less from the viewpoint of preventing the stickiness of the surface and splash to other portions, and more preferably 15 μm or less. On the other hand, the film thickness is preferably equal to or greater than a predetermined thickness from the viewpoint in which a chipped portion is likely to be formed due to a mechanical load, heat, or the like, and an electrical resistance value is likely to be insufficient. Examples of the lower limit of the film thickness include 0.5 μm, 2 μm and 5 μm.

The anticorrosive agent according to the present invention can be used as an anticorrosive agent for an insulated terminated electric wire, for example.

In the insulated terminated electric wire according to the present invention, a terminal fitting is connected to the end of a conductor of an insulated electric wire, and an electrical connection portion between the terminal fitting and the electric wire conductor is covered with the anticorrosive agent according to the present invention. Thus, the corrosion in the electrical connection portion is prevented.

Examples of a material to be used as the base material of the terminal fitting include Cu, a Cu alloy, Al, and an Al alloy. One or more metal layers made of Sn, Ni, or the like are formed as needed on the metal surface of the base material by plating or the like. On the other hand, examples of a material of the electric wire conductor include Cu, a Cu alloy, Al, and an Al alloy.

In the case where the terminal fitting is connected to the end of the conductor, the anticorrosive agent according to the present invention is applied onto a portion in which different metals, such as Cu (alloy) and Sn, and Cu (alloy) and Al (alloy), are combined. For example, in the case where the terminal fittings are made of a Sn-coated Cu alloy and the electric wire conductor is made of a Cu alloy, the anticorrosive agent according to the present invention is applied onto a portion in which the Cu alloy and Sn are combined. In the case where the terminal fittings are made of a Sn-coated Cu alloy and the electric wire conductor is made of an Al alloy, the anticorrosive agent according to the present invention is applied onto a portion in which the Cu alloy, Sn and Al alloy are combined. It should be noted that in the case where the terminal fittings are made of a Sn-coated Cu alloy, the Cu alloy is exposed at the edge portions of the terminal fittings.

Cu is a transition metal, whereas Sn and Al are typical metals. The anticorrosive agent containing the present composition according to the present invention has excellent oil film retainability with respect to all of these metals, thus making it possible to stably maintain the anticorrosive performance for a long period of time.

WORKING EXAMPLES

Although the present invention will be described by way of working examples hereinafter, the present invention is not limited to these working examples.
Synthesis of Present Composition Synthesis Example 1: OL-MBT-Li5

50 g (acid value of 0.163 mol) of oleyl acid phosphate ("Phoslex A18D" manufactured by SC Organic Chemical Co., Ltd., molecular weight of 467 (average), acid value of 183 mg KOH/g) and 50 ml of methanol were placed in a 500 ml flask, and were stirred at 50° C. to yield a uniform solution. A solution obtained by dissolving 10.86 g (0.0816 mol) of 5-methyl-1H-benzotriazole in 50 ml of methanol was gradually added thereto. The resulting clear solution was stirred for 30 minutes while keeping the temperature at 50° C. A solution obtained by dissolving 3.42 g (0.0815 mol) of lithium hydroxide monohydrate in 50 ml of methanol was further added thereto. The mixture was stirred for 10 minutes while keeping the temperature at 50° C. After it was confirmed that the resulting solution kept clear, methanol and generated water were distilled off under reduced pressure using a rotary evaporator. Furthermore, after the addition of 50 mL of toluene, the mixture was distilled in the same manner to distill generated water off by azeotrope, and then the product of interest, which was yellow clear viscous substance, was obtained. OL-MBT-Li5 is the acidic alkyl phosphate ester in which 50% of the free phosphate groups form 5-methyl-1H-benzotriazole salt and the other 50% thereof form lithium salt.

Synthesis Example 2: OL-BT-Li5

A compound was synthesized in the same manner as in Synthesis Example 1, except that 9.72 g of 1,2,3-benzotriazole was added instead of 5-methyl-1H-benzotriazole. OL-BT-Li5 is the acidic alkyl phosphate ester in which 50% of the free phosphate groups form 1,2,3-benzotriazole salt and the other 50% thereof form lithium salt.

Synthesis Example 3: OL-BT-K5

A compound was synthesized in the same manner as in Synthesis Example 2, except that 4.57 g of potassium hydroxide was added instead of lithium hydroxide monohydrate. OL-BT-K5 is the acidic alkyl phosphate ester in which 50% of the free phosphate groups form 1,2,3-benzotriazole salt and the other 50% thereof form potassium salt.

Synthesis Example 4: OL-BT-Ca5

A compound was synthesized in the same manner as in Synthesis Example 2, except that 4.16 g of calcium dimethoxide was added instead of lithium hydroxide monohydrate. OL-BT-Ca5 is the acidic alkyl phosphate ester in which 50% of the free phosphate groups form 1,2,3-benzotriazole salt and the other 50% thereof form calcium salt.

Synthesis Example 5: OL-BT-Li3

A compound was synthesized in the same manner as in Synthesis Example 2, except that the amount of lithium hydroxide monohydrate was changed to 2.05 g. OL-BT-Li3 is the acidic alkyl phosphate ester in which 50% of the free phosphate groups form 1,2,3-benzotriazole salt, another 30% thereof form lithium salt, and the other 20% thereof remain the same.

Synthesis Example 6: IS-MBT-Li5

A compound was synthesized in the same manner as in Synthesis Example 1, except that isostearyl acid phosphate ("Phoslex A180L" manufactured by SC Organic Chemical Co., Ltd., molecular weight of 487 (average), acid value of 178 mg KOH/g) was used instead of oleyl acid phosphate. IS-MBT-Li5 is the acidic alkyl phosphate ester in which 50% of the free phosphate groups form 5-methyl-1H-benzotriazole salt and the other 50% thereof form lithium salt.

Synthesis Example 7: IS-BT-Li5

A compound was synthesized in the same manner as in Synthesis Example 2, except that isostearyl acid phosphate (the same as the above) was used instead of oleyl acid phosphate. IS-BT-Li5 is the acidic alkyl phosphate ester in which 50% of the free phosphate groups form 1,2,3-benzotriazole salt and the other 50% thereof form lithium salt.

Synthesis Example 8: IS-BT-K5

A compound was synthesized in the same manner as in Synthesis Example 7, except that 4.45 g of potassium hydroxide was added instead of lithium hydroxide monohydrate. IS-BT-K5 is the acidic alkyl phosphate ester in which 50% of the free phosphate groups form 1,2,3-benzotriazole salt and the other 50% thereof form potassium salt.

Synthesis Example 9: IS-BT-Ca5

A compound was synthesized in the same manner as in Synthesis Example 7, except that 4.05 g of calcium dimethoxide was added instead of lithium hydroxide monohydrate. IS-BT-Ca5 is the acidic alkyl phosphate ester in which 50% of the free phosphate groups form 1,2,3-benzotriazole salt and the other 50% thereof form calcium salt.

Synthesis Example 10: IS-BT-Li3

A compound was synthesized in the same manner as in Synthesis Example 7, except that the amount of lithium hydroxide monohydrate was changed to 2.00 g. IS-BT-Li3 is the acidic alkyl phosphate ester in which 50% of the free phosphate groups form 1,2,3-benzotriazole salt, another 30% thereof form lithium salt, and the other 20% thereof remain the same.

Synthesis Example 11: EH-BT-Li5

A compound was synthesized in the same manner as in Synthesis Example 2, except that di-2-ethylhexyl acid phosphate ("Phoslex A-208" manufactured by SC Organic Chemical Co., Ltd., molecular weight of 322 (average), acid value of 172 mg KOH/g) was used instead of oleyl acid phosphate. EH-BT-Li5 is the acidic alkyl phosphate ester in which 50% of the free phosphate groups form 1,2,3-benzotriazole salt and the other 50% thereof form lithium salt.

Synthesis Example 12: EH-BT-Ca5

A compound was synthesized in the same manner as in Synthesis Example 11, except that 3.92 g of calcium dimethoxide was added instead of lithium hydroxide monohydrate. EH-BT-Ca5 is the acidic alkyl phosphate ester in which 50% of the free phosphate groups form 1,2,3-benzotriazole salt and the other 50% thereof form calcium salt.

Synthesis Example 13: IS-BI-Li5

A compound was synthesized in the same manner as in Synthesis Example 6, except that 9.37 g of benzimidazole was added instead of 5-methyl-1H-benzotriazole. IS-BI-Li5 is the acidic alkyl phosphate ester in which 50% of the free phosphate groups form benzimidazole salt and the other 50% thereof form lithium salt.

Synthesis Example 14: IS-BI-Ca5

A compound was synthesized in the same manner as in Synthesis Example 13, except that 4.05 g of calcium dimethoxide was added instead of lithium hydroxide monohydrate. IS-BI-Ca5 is the acidic alkyl phosphate ester in which 50% of the free phosphate groups form benzimidazole salt and the other 50% thereof form calcium salt.

Synthesis Example 15: IS-MBTZ-Li5

A compound was synthesized in the same manner as in Synthesis Example 6, except that 13.27 g of 2-mercaptobenzothiazole was added instead of 5-methyl-1H-benzotriazole. IS-MBTZ-Li5 is the acidic alkyl phosphate ester in which 50% of the free phosphate groups form 2-mercaptobenzothiazole salt and the other 50% thereof form lithium salt.

Synthesis Example 16: IS-MBTZ-Ca5

A compound was synthesized in the same manner as in Synthesis Example 15, except that 4.05 g of calcium dimethoxide was added instead of lithium hydroxide monohydrate. IS-MBTZ-Ca5 is the acidic alkyl phosphate ester in which 50% of the free phosphate groups form 2-mercaptobenzothiazole salt and the other 50% thereof form calcium salt.

Synthesis Example 17: IS-TT-Li5

A compound was synthesized in the same manner as in Synthesis Example 6, except that 30.66 g of 1-[N,N-bis(2-ethylhexyl)aminomethyl]methylbenzotriazole (TTLX: manufactured by Johoku Chemical Co. Ltd.) was added instead of 5-methyl-1H-benzotriazole. IS-TT-Li5 is the acidic alkyl phosphate ester in which 50% of the free phosphate groups form TTLX salt and the other 50% thereof form lithium salt.

Synthesis Example 18: IS-TT-Ca5

A compound was synthesized in the same manner as in Synthesis Example 17, except that 4.05 g of calcium dimethoxide was added instead of lithium hydroxide monohydrate. IS-TT-Ca5 is the acidic alkyl phosphate ester in which 50% of the free phosphate groups form TTLX salt and the other 50% thereof form calcium salt.
Synthesis of Comparative Composition Synthesis Example 19: MT-BT-Li5

A compound was synthesized in the same manner as in Synthesis Example 2, except that methyl acid phosphate ("Phoslex A-1" manufactured by SC Organic Chemical Co., Ltd., molecular weight of 119 (average), acid value of 707 mg KOH/g) was used instead of oleyl acid phosphate. MT-BT-Li5 is the acidic alkyl phosphate ester in which 50% of the free phosphate groups form 1,2,3-benzotriazole salt and the other 50% thereof form lithium salt.

Synthesis Example 20: IS-BT

A compound was synthesized in the same manner as in Synthesis Example 7, except that no lithium hydroxide monohydrate was added. IS-BT is the acidic alkyl phosphate ester in which 50% of the free phosphate groups form 1,2,3-benzotriazole salt and the other 50% thereof remain the same.

Synthesis Example 21: OL-Ca8

A compound was synthesized in the same manner as in Synthesis Example 4, except that no 1,2,3-benzotriazole was added and the amount of calcium dimethoxide was changed to 6.66 g. OL-Ca8 is the acidic alkyl phosphate ester in which 80% of the free phosphate groups form calcium salt.
Preparation of Anticorrosive Agent Working Examples 1 to 23, Comparative Examples 1 to 5

An anticorrosive agent was prepared by mixing each of the compositions obtained in Synthesis Examples 1 to 21 and base oil in a predetermined proportion. Types of the base oil and the mixing proportions are as shown in Tables 1 and 2. It should be noted that anticorrosive agents of Comparative Examples 1 and 2 are constituted by only base oil.

It should be noted that PA5, YUBASE and PAO shown in the tables are as follows:
PA5: "Unipress PA5" manufactured by JX Nippon Oil & Energy Corporation
YUBASE: "YUBASE8" (liquid paraffin-based) manufactured by Exxon Mobil Corporation
PAO: "SPECTTRASYN40" (polyalphaolefin-based) manufactured by Exxon Mobil Corporation
Measurement of pH The pH of each anticorrosive agent was measured. Each anticorrosive agent was suspended in pure water in a proportion of about 3% (w/v) by ultrasonic irradiation, and the pH of the suspension was measured using a pH meter equipped with a glass electrode.

f Value

An f value was calculated when $f=l \times x - m \times y - n \times z$, where $x^-$ represents the valence of the acidic alkyl phosphate ester, $y^+$ represents the valence of the azole compound, $z^+$ represents the valence of the metal, l represents the number of moles of the acidic alkyl phosphate ester, m represents the number of moles of the azole compound, and n represents the number of moles of the metal. It should be noted that if the valence of the raw material was indicated, this value was used as the valence of the acidic alkyl phosphate ester, and if the valence of the raw material was not indicated, the valence of the acidic alkyl phosphate ester was determined by an acid value measurement using KOH.
Evaluation of Fluidity Each anticorrosive agent was placed in a glass bottle, the glass bottle was tilted under a heating condition at 70° C., and whether or not the anticorrosive agent flowed was visually observed. An anticorrosive agent that was confirmed to have fluidity was evaluated as "Good", and an anticorrosive agent that was confirmed to have no fluidity was evaluated as "Poor".
Oil Film Retainability A Cu plate or a Sn plate that had been cut into a strip shape of 1 cm×5 cm was immersed in each of the anticorrosive agents, and was irradiated with an ultrasonic wave at 50° C. for 5 minutes using an ultrasonic cleaner. Then, the Cu plate or Sn plate was removed from the anticorrosive agent. An Al plate was used as an anode electrode and the Cu plate or the Sn plate was used as a cathode electrode, and the electrodes were immersed in a 5% NaCl solution to measure a potential difference (corrosion current). The smaller the potential difference is, the larger (thicker) the residual amount (film thickness) of the anticorrosive agent on the surface of the Cu plate or the Sn plate is, and it can be said that the anticorrosive agent has an excellent anticorrosive effect. On the other hand, the larger the potential difference is, the smaller (thinner) the residual amount (film thickness) of the anticorrosive agent on the surface of the Cu plate or the Sn plate is, and it can be said that the anticorrosive agent has a low anticorrosive effect. The oil film retainability was evaluated under three conditions, that is, right after the Cu plate or the Sn plate was removed from the anticorrosive agent, after the Cu plate or the Sn plate removed from the anticorrosive agent was subjected to a hot water treatment, and after the Cu plate or the Sn plate removed from the anticorrosive agent was subjected to a heat treatment. It should be noted that the hot water treatment was performed by cleaning the Cu plate or the Sn plate removed from the anticorrosive agent in hot water at 80° C. under stirring for 1 hour, and then, the Cu plate or the Sn plate was air-dried overnight. The heat treatment was performed by heating the Cu plate or the Sn plate removed from the anticorrosive agent in a vertical position in an oven at 120° C. for 48 hours. The corrosion current obtained by using an untreated Cu plate was 50 μA, and that obtained by using an untreated Sn plate was 2.5 μA. When a current value is less than one tenth of these values, it can be determined that the oil film retainability effect is high.

TABLE 1

| | | | | | | | | | | | Work. Ex. | | | | | | | | | |
|---|---|---|---|---|---|---|---|---|---|---|---|---|---|---|---|---|---|---|---|---|
| | | pH | f value | 1 | 2 | 3 | 4 | 5 | 6 | 7 | 8 | 9 | 10 | 11 | 12 | 13 | 14 | 15 | 16 | 17 | 18 |
| Oil retaining material | OL-MBT-Li5 | 7.0 | 0 | 30 | | | | | | | | | | | | | | | | | |
| | OL-BT-Li5 | 6.8 | 0 | | 30 | | | | | | | | | | | | | | | | |
| | OL-BT-K5 | 6.8 | 0 | | | 30 | | | | | | | | | | | | | | | |
| | OL-BT-Ca5 | 6.5 | 0 | | | | 30 | | | | | | | | | | | | | | |
| | OL-BT-Li3 | 5.8 | 0.304 | | | | | 30 | | | | | | | | | | | | | |
| | IS-MBT-Li5 | 6.8 | 0 | | | | | | 30 | | | | | | | | | | | | |
| | IS-BT-Li5 | 6.9 | 0 | | | | | | | 30 | | | | | | | | | | | |
| | IS-BT-K5 | 6.9 | 0 | | | | | | | | 30 | | | | | | | | | | |
| | IS-BT-Ca5 | 6.7 | 0 | | | | | | | | | 30 | | | | | | | | | |
| | IS-BT-Li3 | 5.9 | 0.31 | | | | | | | | | | 30 | | | | | | | | |
| | EH-BT-Li5 | 6.7 | 0 | | | | | | | | | | | 30 | | | | | | | |
| | EH-BT-Ca5 | 6.7 | 0 | | | | | | | | | | | | 30 | | | | | | |
| | IS-BI-Li5 | 6.8 | 0 | | | | | | | | | | | | | 30 | | | | | |
| | IS-BI-Ca5 | 6.7 | 0 | | | | | | | | | | | | | | 30 | | | | |
| | IS-MBTZ-Li5 | 7.2 | 0 | | | | | | | | | | | | | | | 30 | | | |
| | IS-MBTZ-Ca5 | 7.0 | 0 | | | | | | | | | | | | | | | | 30 | | |
| | IS-TT-Li5 | 7.0 | 0 | | | | | | | | | | | | | | | | | 30 | |
| | IS-TT-Ca5 | 6.9 | 0 | | | | | | | | | | | | | | | | | | 30 |
| | MT-BT-Li5 | 7.0 | 0 | | | | | | | | | | | | | | | | | | |
| | IS-BT | 3.9 | 0.775 | | | | | | | | | | | | | | | | | | |
| | OL-Ca8 | 4.8 | 0.304 | | | | | | | | | | | | | | | | | | |
| Base oil | Nujol | | | 70 | 70 | 70 | 70 | 70 | 70 | 70 | 70 | 70 | 70 | 70 | 70 | 70 | 70 | 70 | 70 | 70 | 70 |
| | PA5 | | | | | | | | | | | | | | | | | | | | |
| | YUBASE | | | | | | | | | | | | | | | | | | | | |
| | PAO | | | | | | | | | | | | | | | | | | | | |
| 70° C. fluidity | Right after | | | Good | Good | Good | Good | Good | Good | Good | Good | Good | Good | Good | Good | Good | Good | Good | Good | Good | Good |
| | Hot water treatment | | | | | | | | | | | | | | | | | | | | |
| | Heat treatment | | | | | | | | | | | | | | | | | | | | |
| Cu plate (un-treated 50 μA) | Right after | | | 1.1 | 0.8 | 1.5 | 0.7 | 1.4 | 1.7 | 1.7 | 1.4 | 1.1 | 1.7 | 2.0 | 1.8 | 1.9 | 1.7 | 1.4 | 1.3 | 0.8 | 0.7 |
| | Hot water treatment | | | 1.6 | 0.9 | 1.9 | 0.9 | 1.9 | 1.8 | 1.7 | 2.1 | 1.4 | 2.1 | 2.1 | 1.9 | 2.0 | 1.9 | 1.8 | 1.8 | 0.9 | 0.8 |
| | Heat treatment | | | 1.5 | 0.9 | 1.5 | 0.9 | 1.6 | 2.0 | 1.9 | 1.7 | 1.6 | 1.8 | 2.4 | 2.1 | 2.1 | 1.9 | 2.1 | 1.9 | 1.1 | 0.9 |
| Sn plate (un-treated 2.5 μA) | Right after | | | 0.04 | 0.04 | 0.06 | 0.04 | 0.15 | 0.06 | 0.06 | 0.17 | 0.05 | 0.11 | 0.14 | 0.12 | 0.11 | 0.12 | 0.13 | 0.09 | 0.04 | 0.04 |
| | Hot water treatment | | | 0.08 | 0.07 | 0.15 | 0.07 | 0.18 | 0.07 | 0.08 | 0.19 | 0.06 | 0.18 | 0.15 | 0.14 | 0.14 | 0.17 | 0.15 | 0.14 | 0.07 | 0.08 |
| | Heat treatment | | | 0.09 | 0.07 | 0.09 | 0.07 | 0.18 | 0.07 | 0.07 | 0.17 | 0.08 | 0.14 | 0.16 | 0.13 | 0.14 | 0.18 | 0.17 | 0.14 | 0.08 | 0.08 |

TABLE 2

| | | pH | f value | Work. Ex. 19 | 20 | 21 | 22 | 23 | Comp. Ex. 1 | 2 | 3 | 4 | 5 |
|---|---|---|---|---|---|---|---|---|---|---|---|---|---|
| Oil retaining material | OL-MBT-Li5 | 7.0 | 0 | | | | | | | | | | |
| | OL-BT-Li5 | 6.8 | 0 | 10 | | | | | | | | | |
| | OL-BT-K5 | 6.8 | 0 | | | | | | | | | | |
| | OL-BT-Ca5 | 6.5 | 0 | | | | | | | | | | |
| | OL-BT-Li3 | 5.8 | 0.304 | | | | | | | | | | |
| | IS-MBT-Li5 | 6.8 | 0 | | | | | | | | | | |
| | IS-BT-Li5 | 6.9 | 0 | | 10 | 30 | 30 | 30 | | | | | |
| | IS-BT-K5 | 6.9 | 0 | | | | | | | | | | |
| | IS-BT-Ca5 | 6.7 | 0 | | | | | | | | | | |
| | IS-BT-Li3 | 5.9 | 0.31 | | | | | | | | | | |
| | EH-BT-Li5 | 6.7 | 0 | | | | | | | | | | |
| | EH-BT-Ca5 | 6.7 | 0 | | | | | | | | | | |
| | IS-BI-Li5 | 6.8 | 0 | | | | | | | | | | |
| | IS-BI-Ca5 | 6.7 | 0 | | | | | | | | | | |
| | IS-MBTZ-Li5 | 7.2 | 0 | | | | | | | | | | |
| | IS-MBTZ-Ca5 | 7.0 | 0 | | | | | | | | | | |
| | IS-TT-Li5 | 7.0 | 0 | | | | | | | | | | |
| | IS-TT-Ca5 | 6.9 | 0 | | | | | | | | | | |
| | MT-BT-Li5 | 7.0 | 0 | | | | | | | | 30 | | |
| | IS-BT | 3.9 | 0.775 | | | | | | | | | 30 | |
| | OL-Ca8 | 4.8 | 0.304 | | | | | | | | | | 30 |
| Base oil | Nujol | | | 90 | 90 | | | | 100 | | 70 | 70 | 70 |
| | PA5 | | | | | 70 | | | | 100 | | | |
| | YUBASE | | | | | | 70 | | | | | | |
| | PAO | | | | | | | 70 | | | | | |
| | 70° C. fluidity | | | Good | Good | Good | Good | Good | Good | Good | Good | Good | Poor |
| Cu plate (untreated 50 μA) | Right after | | | 0.9 | 1.7 | 1.8 | 1.8 | 1.7 | 45.2 | 45.1 | 17.5 | 2.1 | 14.5 |
| | Hot water treatment | | | 1.0 | 2.0 | 2.1 | 2.0 | 1.8 | 49.0 | 48.8 | 21.6 | 2.4 | 14.4 |
| | Heat treatment | | | 1.1 | 1.8 | 2.1 | 2.1 | 1.9 | 46.2 | 48.5 | 29.4 | 2.8 | 18.0 |
| Sn plate (untreated 2.5 μA) | Right after | | | 0.09 | 0.09 | 0.11 | 0.10 | 0.08 | 1.90 | 2.26 | 1.31 | 2.10 | 0.15 |
| | Hot water treatment | | | 0.09 | 0.11 | 0.15 | 0.15 | 0.09 | 2.25 | 2.41 | 1.57 | 2.24 | 0.19 |
| | Heat treatment | | | 0.09 | 0.11 | 0.16 | 0.16 | 0.09 | 2.31 | 2.44 | 1.69 | 2.26 | 0.24 |

As shown in Tables 1 and 2, the anticorrosive agents of Working Examples 1 to 23 were in a liquid state with fluidity at 70° C., and it was confirmed from the evaluation results of the oil film retainability that they could retain the base oil on the surfaces of various metals. Moreover, it was confirmed that the retainability was not deteriorated due to the hot water treatment and the heat treatment, and the effect was firmly exhibited on the metal surfaces.

In contrast, since the anticorrosive agents of Comparative Examples 1 and 2 were constituted by only the base oil, the evaluation results of the oil film retainability revealed that the corrosion current values were very large, and it seems that substantially no base oil was retained even right after the application onto the metal surfaces.

It seems that the anticorrosive agent of Comparative Example 3 had low compatibility with the base oil since the alkyl group of the acidic alkyl phosphate ester in the comparative composition was a methyl group and the number of carbon atoms was small. The evaluation results of the oil film retainability revealed that the corrosion current values were very large, and it seems that substantially no base oil was retained even right after the application onto the metal surfaces.

It seems that since the comparative composition in the anticorrosive agent of Comparative Example 4 was constituted by only the adduct of the acidic alkyl phosphate ester and the azole compound, the corrosion current value was large when the Sn plate was used, and the oil film retainability effect for the surface of Sn was low.

It seems that since the comparative composition in the anticorrosive agent of Comparative Example 5 was constituted by only the adduct of the acidic alkyl phosphate ester and the metal, the corrosion current value was large when the Cu plate was used, and the oil film retainability effect for the surface of Cu was low. Moreover, it was found that the fluidity was low at 70° C.

It should be noted that in order to confirm that the base oil of the anticorrosive agents of the working examples remained on the metal surface, the surface-reflection IR of a Cu plate onto which the anticorrosive agent of Working Example 9 was applied as an example was measured using a RAS method before and after the heat treatment. For comparison, the surface-reflection IR of a Cu plate onto which only the Nujol was applied was also measured before and after the heat treatment. Furthermore, for comparison, the surface-reflection IR of a Cu plate onto which only IS-BT-Ca5 of Synthesis Example 9 was applied and that was not subjected to the heat treatment was also measured. FIG. 1 shows the results. It should be noted that a symmetric deformation vibration of a methyl group at 1375 cm$^{-1}$ was used as a reference to detect Nujol.

It was found from FIG. 1 that peak sizes at 1375 cm$^{-1}$ of Nujol containing IS-BT-Ca5 (IS-BT-Ca5/Nujol) were substantially the same before and after heated, whereas the peak size was reduced after heated in the case where only Nujol was used. Since there was no peak at 1375 cm$^{-1}$ in the case where only IS-BT-Ca5, which contained no Nujol, was used, it can be said that Nujol containing IS-BT-Ca5 is retained even under heating conditions, and IS-BT-Ca5 serves as an oil film retention material.

Since the present composition has an excellent function of retaining the base oil on the metal surface, it is found that use of the present composition as the anticorrosive agent makes it possible to maintain the anticorrosive performance for a long period of time.

While the embodiment of the present invention has been described in detail, the present invention is not limited to the above-described embodiment, and various modifications can be made without departing from the gist of the present invention.

The invention claimed is:

1. An anticorrosive agent containing a base oil and a composition having an oil film retention function, wherein an amount of the composition having an oil film retention function in the anticorrosive agent is 10 mass % or more;
the composition having an oil film retention function consists of a component (a) and a component (b); wherein
the component (a) is an adduct of an azole compound and an acidic alkyl phosphate ester, where the acidic alkyl phosphate ester includes one or more compounds represented by General Formula (1):(Chemical Formula 1)

$$P(=O)(-OR_1)(-OH)_2 \qquad (1)$$

or General Formula (2):(Chemical Formula 2)

$$P(=O)(-OR_1)_2(-OH) \qquad (2)$$

where $R_1$ represents an organic group having four or more carbon atoms;
the component (b) is an adduct of a metal and an acidic alkyl phosphate ester having a common structure to that of the acidic alkyl phosphate ester used to form the adduct of component (a).

2. The anticorrosive agent according to claim 1, wherein a content ratio of the component (a) to the component (b) in molar ratio is 1:9 to 9:1.

3. The anticorrosive agent according to claim 1, wherein a pH of the composition having an oil film retention is 4 or more.

4. The anticorrosive agent according to claim 1, wherein the azole compound is at least one selected from 1-[N,N-bis(2-ethylhexyl)aminomethyl]methylbenzotriazole, pyrrole, imidazole, pyrazole, 1,2,3-triazole, 1,2,4-triazole, tetrazole, isoindole, benzimidazole, indazole, 1H-benzotriazole, 2H-benzotriazole, imidazo[4,5-b]pyridine, indole, purine, pyrazolo[3,4-d]pyrimidine, triazolo[4,5-d]pyrimidine, and benzothiazole, or a derivative thereof.

5. The anticorrosive agent according to claim 1, wherein the metal is at least one selected from alkali metals, alkaline earth metals, aluminum, titanium, and zinc.

6. An insulated terminated electric wire in which an electrical connection portion between a terminal fitting and an electric wire conductor is covered with the anticorrosive agent according to claim 1.

* * * * *